April 17, 1934.  F. A. ANETSBERGER ET AL  1,955,269
AIR CONDITIONING APPARATUS
Filed June 29, 1931   2 Sheets-Sheet 1
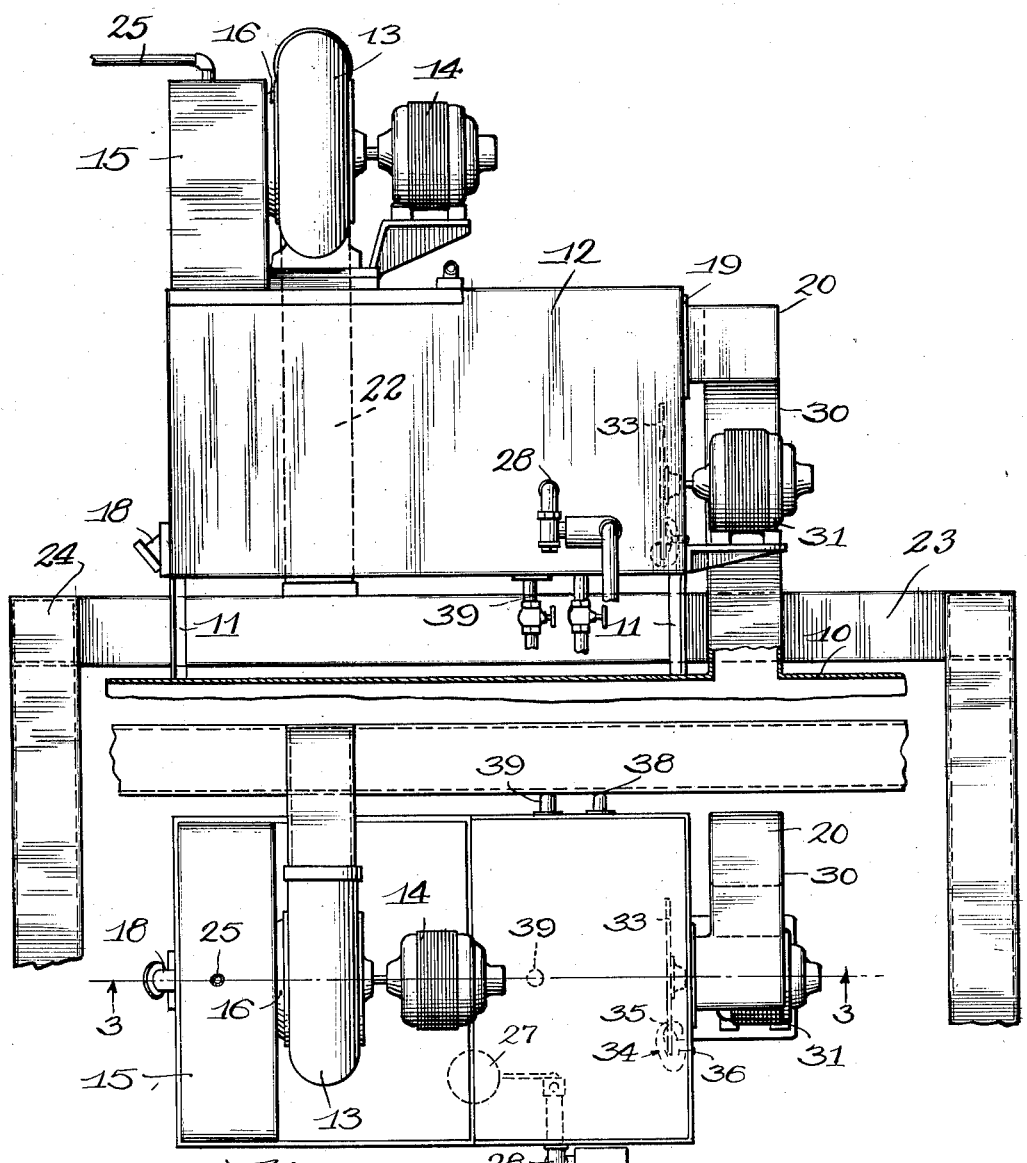

April 17, 1934. F. A. ANETSBERGER ET AL 1,955,269
AIR CONDITIONING APPARATUS
Filed June 29, 1931  2 Sheets-Sheet 2
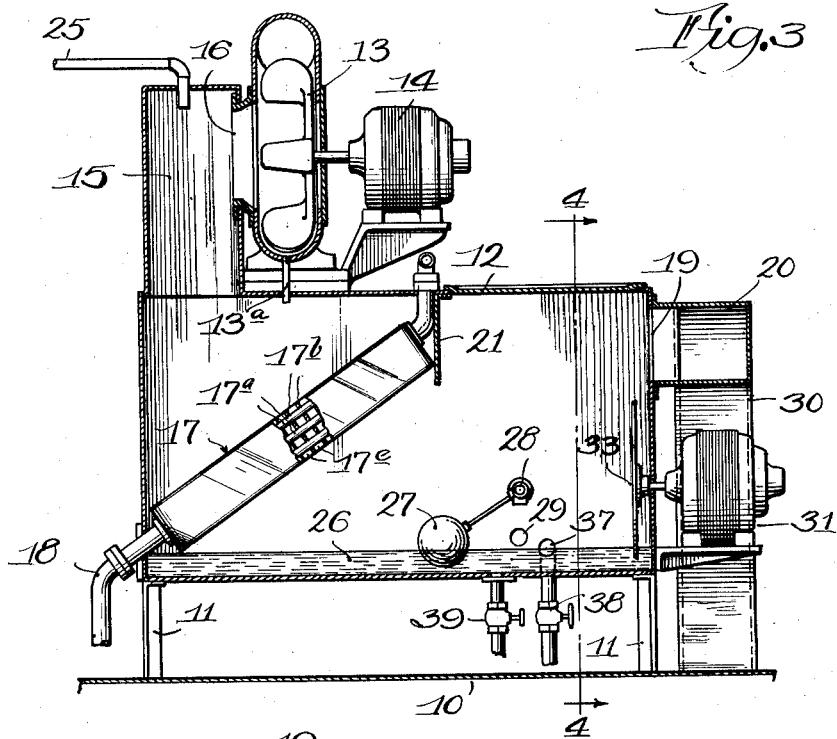
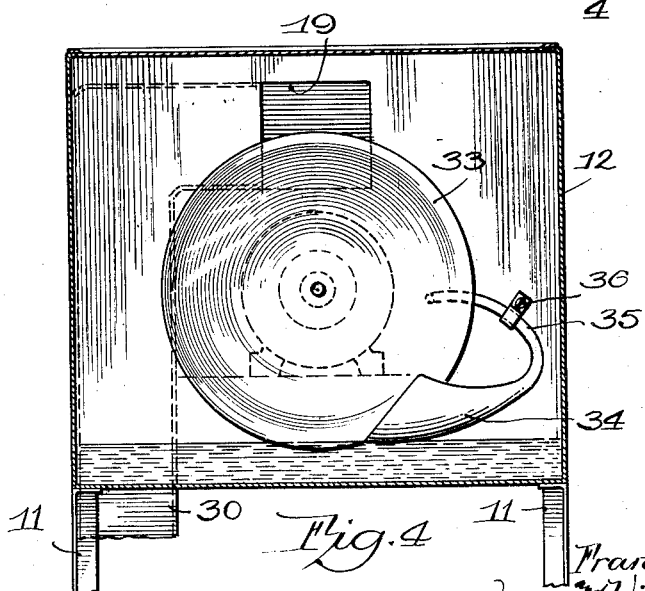
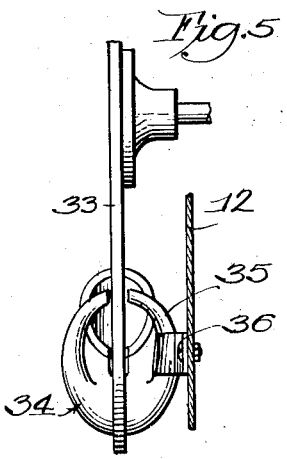

Patented Apr. 17, 1934

1,955,269

UNITED STATES PATENT OFFICE 1,955,269

AIR CONDITIONING APPARATUS

Frank A. Anetsberger and William Anetsberger, Chicago, Ill.

Application June 29, 1931, Serial No. 547,483

5 Claims. (Cl. 261—9)

This invention relates to improvements in air-conditioning apparatus. The principal object of the invention is to provide apparatus for large proof boxes or chambers, which apparatus comprises means for effecting the circulation of air from the proof box through the apparatus and to there treat it as by heating it, cooling it, or increasing its humidity as conditions may require. Another object of the invention relates to means for creating a spray of water in sheet form across the air stream which is caused to flow through the apparatus for reducing the temperature of the air, when required, and also increasing its humidity.

Other objects relate to various features of construction and arrangement of parts which will be apparent from the consideration of the following specification and accompanying drawings wherein:

Fig. 1 is a side elevation of apparatus embodying the present improvements.

Fig. 2 is a top plane view thereof.

Fig. 3 is a vertical sectional view taken on line 3—3 of Fig. 2.

Fig. 4 is a transverse vertical sectional view taken on line 4—4 of Fig. 3.

Fig. 5 is a detached view of the spraying disc and associated water receiving and delivering device of modified form.

In the drawings 10 indicates the top or roof of a proof box or proofing chamber used in bakeries. Supported on the top 10 by legs 11 is an air conditioning chamber 12. Positioned above the chamber is a blower 13 which is preferably driven by an electric motor 14. A vertical extension 15 of the chamber communicates by means of the outlet port 16 with the blower 13, as shown in Fig. 3. In the rear or left end of the chamber 12 is a radiator 17, which by means of a pipe 18 receives steam from a boiler or other suitable source of supply. The radiator 17 is mounted in the inclined position shown so that water from the spraying device hereinafter described will not lodge in the transverse tubes of the radiator and impede the passage of air through the same. In the front or right-hand end of the casing 12 is an inlet port 19, with which communicates a conduit 20 which passes through the top 10 of the proof box. When the blower 13 is operating, air is drawn from adjacent the upper portion of the interior of the proof box through the conduit 20, through port 19, under baffle 21, through the transverse passages of the radiator 17, which extends the entire width of the casing, up through extension 15 and into the blower. From the blower the air passes through a conduit 22 which may have branches 23 and 24 the former of which passes downwardly through the roof into the interior of the forward portion of the proof box while the latter passes rearwardly and down through the roof 10 into the opposite end of the proof box.

The air of the proof box is thus circulated effectively through the conditioning apparatus. As mentioned above, steam may be admitted to the radiator 17 for heating the air when such is required. A steam pipe 25 projects into the casing 15 for supplying moisture in the form of steam to the air for increasing its humidity.

During warm weather it frequently is desirable to reduce the temperature of the air in the proof box and also to increase its humidity and for this purpose the casing 12 may be so constructed as to hold a quantity of water 26, as shown in Fig. 3. For maintaining the water at the proper level a float 27 is provided which operates valve mechanism (not shown) in the water inlet pipe 28. An overflow 29 is also preferably provided so that the water can be renewed as desired, either because of the accumulation of foreign matter therein or because of its increase in temperature.

A motor 30 is shown positioned on a support 31, adjacent the right-hand end of the casing 12 as shown in Fig. 3, the shaft 32 of which carries a metal disc 33. The disc is partly immersed or dips into the water 26 in the casing or tank. Upon rapid rotation of the disc by the motor the water is thrown in the form of a spray from its periphery. The action of the disc alone results in the spray being more or less localized in the upper right-hand corner of the chamber, as viewed in Fig. 4, and to distribute the spray and to increase the spraying action of the disc, a water receiving chamber 34 has been provided as shown. This member may comprise a conical shaped receptacle, the large open end of which is positioned close to the periphery of the disc on its ascending side. Extending from the receiving member 34 is an extension 35 which extends around to one side of the disc as illustrated in Fig. 4 for example. The member 34 receives the water thrown off by the disc 33, the impelling force of which is sufficient to cause the water to flow through the extension 35, the open end of which is directed toward one face of the disc.

It has been found that the water delivered to the face of the disc at a point inwardly of its periphery substantially as indicated in Fig. 4 results in the water being sprayed in the form of a sheet across the entire cross-section of the chamber 12. As viewed in Fig. 5 the member 34 may be provided with two extensions 35, one each delivering water to a face of the disc, and if desired, at different positions with respect to the periphery thereof. The extensions 35 may be flexible or adjustable, if desired, whereby the point or points at which the water is directed against the face or faces of the disc can be varied to increase the quantity of water in portions of the spray, as conditions may require. The extensions 35 may be secured in position by any approved means, as by supporting members 36.

The spraying of water across the entire cross-sectional area of the chamber effectively cools the stream of air flowing through the port 19, as will be seen. A certain amount of moisture is also carried away by the air in passing through the spray and assists in the humidifying action of the apparatus. By using the rotatable disc and the receiving and conveying members 34 and 35 respectively in conjunction therewith, the use of a conventional pump for creating a spray has been avoided.

The inclined tubes 17a of the radiator 17 and the transverse fins 17b define transverse passages 17c through the radiator through which the air passes. The radiator thus functions as a baffle and prevents the passage of excess moisture into the proof box. The inclination of the passages results in the water removed from the air stream being returned to the water tank and the passages of the radiator thus kept open whereby the relatively free passage of air through the radiator is not impeded.

Condensation from the steam pipe 25 drops into the casing 12, as is apparent from Fig. 3. As some condensation or other moisture may collect in the casing of the blower or fan 13, a small pipe 13a is provided for returning such water to the casing 12. As the water in the tank may become too warm at times to cool the air adequately, especially in warm weather, an additional overflow 37 is provided at, or slightly below, the normal water level. This overflow is provided with a valve 38 as shown in Fig. 2. When the valve is open, the water level is lowered sufficiently to cause the float 27 to open the float valve and thus provide a constant flow of fresh water into and from the tank. A drain 39 is provided for cleaning and completely draining the tank when desired.

What we claim is:

1. Spraying apparatus comprising a liquid holding tank, a rotatable disc partially immersed in the liquid thereof, means for rotating said disc, a stationary receptacle adjacent the lower ascending portion of said disc into which liquid is thrown directly by said disc when rotating, and a conduit for carrying liquid from said receptacle and discharging the same against one or both faces of said disc.

2. Humidifying apparatus for proof boxes comprising a chamber casing having an inlet and outlet communicating with said box, a blower for circulating air through said chamber from and to said box, and means for cooling the air passing through said chamber, said means comprising an open top water holding receptacle, a rapidly rotatable disc dipping into said water, a water receiving member positioned adjacent the lower ascending portion of said disc for receiving water from the periphery of said disc, and a tube for conveying water from said receiving member and delivering the same against a pre-determined portion of a face of said disc to be sprayed by the latter across the current of air flowing from said inlet.

3. In combination, a casing having air inlet and outlet ports, a blower for circulating the air through said ports and casing, water holding means in said casing, and means for spraying water in the form of a sheet across the path of the air current flowing through said casing between said ports, said means comprising a rapidly rotating disc dipping into said water, and a member adjacent the lower ascending portion of said disc for receiving water directly from the periphery of said disc and delivering the same against one or both faces of said disc.

4. The combination with a proof box of a casing positioned adjacent the same, a conduit for conveying air from said box to said casing, a conduit for returning the air from said casing to the interior of said box, a blower for effecting the circulation of air through said conduits and casing, and means in said casing for spraying water across said circulating air stream, said means comprising a water holding receptacle below the air stream and a vertical rotatable disc partly immersed in the water thereof, and a member for receiving water from the lower ascending portion of the periphery of said disc and conveying said water against a face of said disc to be sprayed by the same across the air stream.

5. Air conditioning apparatus comprising a casing adapted to hold a supply of water, means for circulating air through said casing, means in said casing for spraying water into the air stream and a radiator in said casing having transverse fins inclined to the horizontal constituting baffles for removing excess moisture from said air stream, the inclination of said fins being sufficient to cause the water removed thereby to escape from said fins by gravity.

FRANK A. ANETSBERGER.
WILLIAM ANETSBERGER.